(12) United States Patent
Hashimoto

(10) Patent No.: US 7,116,898 B2
(45) Date of Patent: Oct. 3, 2006

(54) DVD AUTO-CHANGER CAPABLE OF SETTING ALL-REPEAT-MODE

(75) Inventor: Chiaki Hashimoto, Daito (JP)

(73) Assignee: Funai Electric Co., Ltd., Daito (JP)

( * ) Notice: Subject to any disclaimer, the term of this patent is extended or adjusted under 35 U.S.C. 154(b) by 1110 days.

(21) Appl. No.: 09/934,685

(22) Filed: Aug. 23, 2001

(65) Prior Publication Data

US 2002/0024893 A1 Feb. 28, 2002

(30) Foreign Application Priority Data

Aug. 29, 2000 (JP) ............................ 2000-259294

(51) Int. Cl.
*H04N 5/85* (2006.01)
(52) U.S. Cl. .................. 386/125; 386/386; 386/40; 386/126; 369/30.08; 369/30.09
(58) Field of Classification Search ............. 369/30.08, 369/30.09
See application file for complete search history.

(56) References Cited

U.S. PATENT DOCUMENTS 5,748,585 A * 5/1998 Tsukamoto et al. ...... 369/47.23
6,434,097 B1 * 8/2002 Lewis et al. ............. 369/47.11
6,483,782 B1 * 11/2002 Steinbach .................. 369/6
2001/0013083 A1 * 8/2001 Nakamura .................. 711/111

FOREIGN PATENT DOCUMENTS

| JP | 01-319165 | 12/1989 |
|---|---|---|
| JP | 08-045250 | 2/1996 |
| JP | 10-112113 | 4/1998 |
| JP | 2000-156023 | 6/2000 |

* cited by examiner

*Primary Examiner*—Thai Tran
*Assistant Examiner*—Helen Shibru
(74) *Attorney, Agent, or Firm*—Crowell & Moring LLP

(57) ABSTRACT

A DVD auto-changer includes a controller, and in the DVD auto-changer, an all-repeat-mode that a plurality of disks stocked are exchanged to be successively reproduced can be set. The controller determines whether the all-repeat-mode is set or not, and unconditionally reproduces a story portion upon exchanging the disks when the all-repeat-mode is set. In other words, the controller obtains a start address of the story portion, and reproduces it from the start address.

10 Claims, 16 Drawing Sheets

FIG. 5

VIDEO MANAGER (VMG)

| VIDEO MANAGER INFORMATION (VMGI) (REQUIRED) | VIDEO MANAGER INFORMATION MANAGEMENT TABLE (VMGI_MAT) (REQUIRED) |
|---|---|
| VIDEO MANAGER INFORMATION FOR MENU VIDEO OBJECT SET (VMGM_VOBS) (OPTION) | TITLE SEARCH POINTER TABLE (TT_SRPT) (REQUIRED) |
| VIDEO MANAGER INFORMATION FOR BACKUP (VMGI_BUP) (REQUIRED) | VIDEO TITLE SET ATTRIBUTE TABLE (VTS_ATRT) (REQUIRED) |

FIG. 6

VMGI_MAT

|  | CONTENTS |
|---|---|
| VMG_ID | IDENTIFIER OF VIDEO MANAGER |
| VVMGI_SZ | SIZE OF VIDEO MANAGEMENT INFORMATION |
| VERN | VERSION NO. OF DVD STANDARD |
| VMG_CAT | CATEGORY OF VIDEO MANAGER |
| VLMS_ID | IDENTIFIER OF VOLUME SET |
| VTS_Ns | NO. OF VIDEO TITLE SET |
| PVR_ID | ID OF SUPPLIER |
| VMGM_VOBS_SA | START ADDRESS OF VMGM_VOBS |
| VMGI_MAT_EA | END ADDRESS OF VMGI_MAT |
| TT_SRPT_SA | START ADDRESS OF TT_SRPT |
| VTS_ATRT_SA | START ADDRESS OF VTS_ATRT |
| VMGM_V_ATR | VIDEO ATTRIBUTE OF VMGM |
| VMGM_AST_Ns | NO. OF AUDIO STREAM OF VMGM |
| VMGM_AST_ATR | AUDIO STREAM ATTRIBUTE OF VMGM |
| VMGM_SPST_Ns | NO. OF SUB IMAGE STREAM OF VMGM |
| VMGM_SPST_ATR | SUB IMAGE STREAM ATTRIBUTE OF VMGM |

FIG. 8

TT_SRPTI

|  | CONTENTS |
|---|---|
| TT_SRP_Ns | NO OF TITLE SEARCH POINTER |
| TT_SRPT_EA | END ADRESS OF TT_SRPT |

FIG. 9

TT_SRP

|  | CONTENTS |
|---|---|
| TT_PB_TY | REPRODUCING TYPE OF TITLE |
| PTT_Ns | NO. OF PART OF TITLE |
| VTSN | NO. OF VIDEO TITLE |
| VTS_TTN | NO. OF VTS TITLE |
| VTS_SA | START ADDRESS OF VIDEO TITLE SET |

FIG. 11

VTSI_MAT

| | CONTENTS |
|---|---|
| VTS_ID | IDENTIFIER OF VIDEO TITLE SET |
| VTS_SZ | SIZE OF VIDEO TITLE SET |
| VERN | VERSION NO. OF DVD VIDEO STANDARD |
| VTS_CAT | CATEGORY OF VIDEO TITLE SET |
| VTSM_VOB_SA | START ADDRESS OF VTSM_VOBS |
| VTSTT_VOB_SA | START ADDRESS OF VTSTT_VOBS |
| VTSI_MAT_EA | END ADDRESS OF VTSI_MAT |
| VTS_DAPT_SA | START ADDRESS OF VTS_DAPT |
| VTS_PGCIT_SA | START ADDRESS OF VTS_PGCIT |
| VTS_PGCIT_UT_SA | START ADDRESS OF VTS_PGCIT_UT |
| VTS_MAPT_SA | START ADDRESS OF VTS_MAPT |
| VTS_V_ATR | VIDEO ATTRIBUTE |
| VTS_AST_Ns | NO. OF AUDIO STREAM OF VTS |
| VTS_AST_ATR | AUDIO STREAM ATTRIBUTE OF VTS |
| VTS_SPST_Ns | NO. OF SUB IMAGE STREAM OF VTS |
| VTS_SPST_ATR | SUB IMAGE STREAM ATTRIBUTE OF VTS |
| VTSM_AST_Ns | NO. OF AUDIO STREAM OF VTSM |
| VTSM_AST_ATR | AUDIO STREAM ATTRIBUTE OF VTSM |
| VTS_SPST_Ns | NO. OF SUB IMAGE STREAM OF VTSM |
| VTS_SPST_ATR | SUB IMAGE STREAM ATTRIBUTE OF VTSM |

ONE-LAYER DVD

TWE-LAYERED DVD

DVD AUTO-CHANGER CAPABLE OF SETTING ALL-REPEAT-MODE

BACKGROUND OF THE INVENTION

1. Field of the Invention

This invention relates to DVD auto-changers, more particularly, to a DVD auto-changer capable of setting an all-repeat-mode in which a plurality of disks stocked are exchanged to be successively reproduced.

2. Description of the Prior Art

An example of this kind of a conventional DVD auto-changer is disclosed in a Japanese Patent Laying-open No.8-45250 (G 11B 27/10, 17/24, 19/02) laid-open on Feb. 16, 1996. In this DVD auto-changer, by previously reading-in management information of all the disks stocked, the kind of disks is identified, and when a story portion of one work is divided among a plurality of disks, for example, these disks are automatically exchanged in a proper order, and reproduced.

However, there are some disks set to make a user select a reproducing method, etc. by displaying a menu screen at first. In the case of these disks, upon exchanging the disks, since the menu screen is displayed, reproduction of the story portion is stopped along the way. Accordingly, each time the disks are exchanged, the user has to execute a select operation, and it gives the user a bother in operating. Since the reproduction of the story portion is stopped along the way upon exchanging the disks, in the case the story portion of one work is divided into two or more sheets of disk, ease of viewing is remarkably impaired.

SUMMARY OF THE INVENTION

Therefore, it is a primary object of the present invention to provide a DVD auto-changer capable of improving in ease of operation and viewing.

A DVD auto-changer according to this invention is a DVD auto-changer to exchange and successively reproduce a plurality of disks stocked and comprises: a setting means for setting an all-repeat-mode; an exchanging means for exchanging the disks; and a story portion reproducing means for unconditionally reproducing a story portion upon exchanging the disks when the all-repeat-mode is set.

In the DVD auto-changer of this invention, the all-repeat-mode for exchanging and successively reproducing the plurality of disks stocked can be set. Determination is made as to whether the all-repeat-mode is set or not. When the all-repeat-mode is set, upon exchanging the disks, the story portion of the disk is unconditionally reproduced. Accordingly, there is no occurrence of the stop of the reproduction along the way due to the display of a menu screen.

It would be appropriate, after obtaining a start address of the story portion in order to unconditionally reproduce the story portion, the reproduction is executed from the start address.

It is noted that the story portion is so recorded in a disk as to start from the specified chapter (video object) included in the specified title (video object set). Accordingly, if the start address of the first chapter included in the first title is obtained and the reproduction is executed from the start address, the story portion can be reproduced.

Furthermore, since the story portion is generally so recorded on the disk as to start from the first chapter included in the first title, it would be appropriate to reproduce it from the first chapter included in the first title.

Meanwhile, since the story portion has the longest data length, by detecting the data group having the longest data length with reference to the disk information (management information) such as TOC information in a CD so as to obtain the start address of this data group, the reproduction may be executed from the start address.

According to this invention, in the case the all-repeat-mode is set, since the menu screen is not displayed, the story portion can be successively reproduced even if the disk is exchanged. In other words, the user can successively view the story portion with no operation for the menu selection along the way. That is, ease of operation and viewing can be improved.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing a data configuration of a VMG;

FIG. 6 is an illustrative view showing contents of $VBGI_{13}MAT$;

FIG. 8 is an illustrative view showing contents of $TT_{13}SRPT$;

FIG. 9 is an illustrative view showing contents of $TT_{13}SRP$;

FIG. 11 is an illustrative view showing contents of $VTSI_{13}MAT$;

DETAILED DESCRIPTION OF THE PREFERRED EMBODIMENTS

Figure 1:
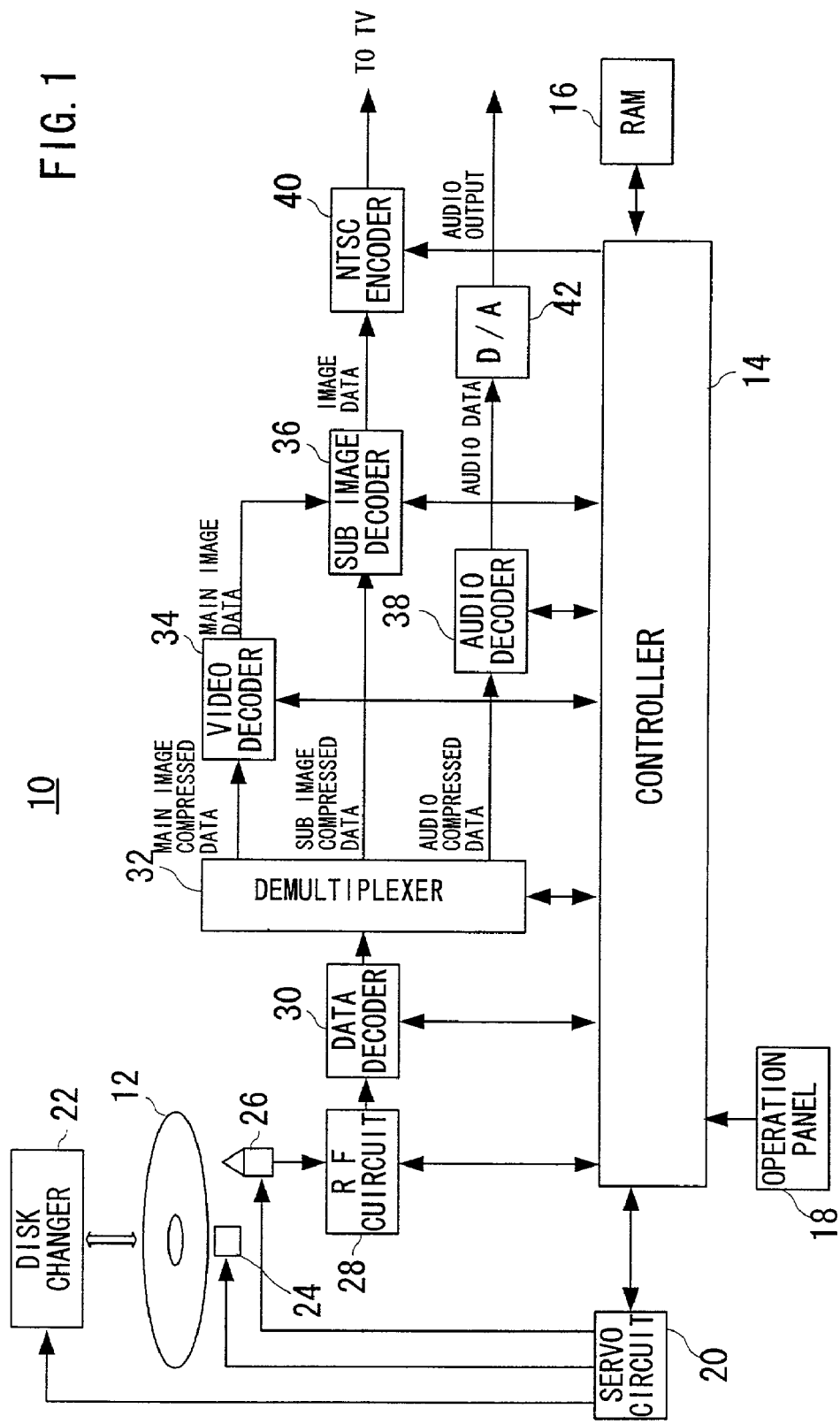
FIG. 1 is an illustrative view showing a disk auto-changer of one embodiment according to the present invention.

Referring to FIG. 1, a disc auto-changer 10 of this embodiment is for exchanging and reproducing a plurality of disks 12 such as a DVD (Digital Video Disc or Digital Versatile Disc) or a CD (Compact Disc), and includes a controller 14 to control an operation of an overall apparatus. The controller 14 is connected with a RAM 16 for storing information that is read out of the disk 12 and required to reproduce and etc., and an operation panel 18 to perform an input operation.

The operation panel 18 is mounted on a front surface of an apparatus body not shown. The operation panel 18 has, although not shown, a power key for turning on/off power, a reproduction key for reproducing a disk 12, a stop key to stop reproducing, a pause key to suspend a reproduction, a skip key to skip (FF (Fast Forward) or FR (Fast Reverse)) titles and chapters, an all-repeat-mode key for executing reproduction in an all-repeat-mode (hereinafter, referred to as AR key), and etc. Accordingly, when given the input operation by the user, operation signals are supplied from the operation panel 18 to the controller 14, and the controller 14 outputs control signals corresponding to the operation signals to execute various processings.

It is noted, in the case the controller 14 is connected with a remocon light-receiving circuit (not shown), a remote control can be made by utilizing a remocon transmitter (not shown).

Furthermore, the controller 14 is connected with a servo circuit 20. The servo circuit 20 is connected with each of motors (not shown) provided to a disk changer 22 for exchanging disks 12, a spindle motor 24 for rotating the disk 12 with a turntable (not shown), a thread motor (not shown) to move, in the radial direction (thread direction) of the disk, an optical pickup 26 for reading information recorded on the disk 12, and etc. The servo circuit 20 drives these motors for rotation with receiving the control signals from the controller 14.

The disk changer 22 exchanges the disks 12 as described above. More specifically, the disk changer 22 returns the disk 12 mounted on the turntable to its original housing portion (not shown) and mounts the disk 12 to be reproduced on the turntable from the housing portion.

It is noted the structure of the disk changer 22 is not limited to the above described structure. For example, it may be a type which picks up the desired disk 12 one by one from a magazine stocker stocking a plurality of disks 12 and moves it to the turntable, and it may be a type which sends the desired disk to reproducing portion (turntable) by rotating a disk tray stocking a plurality of disks 12.

The optical pickup 26 has two objective lenses (not shown), e.g. a lens for a DVD and a lens for a CD which are used depending on the kind of the disk 12 (DVD or CD). Accordingly, it is possible to read out information stored in the disk 12 regardless of the kind of the disk 12 (DVD or CD). Meanwhile, the optical pickup 26 is coupled to the thread motor through a pickup feeding mechanism (not shown) such as a rack and pinion to be moved in the thread direction (the radial direction) of the disk 12. Furthermore, the servo circuit 20 described above executes a focus control and a tracking control in accordance with the control signals from the controller 14.

Accordingly, the optical pickup 26 can access to a desired position (address) of the disk 12, and read out the information (RF signal) stored in the disk 12. The RF signal (reproduced signal) is subjected to a waveform equalization process and a binarization process by an RF circuit 28. This reproduced data after such processes is subjected to a decode process such as data demodulation and error correction by a data decoder 30.

In the case the disk 12 is a DVD, the reproduced data is reproduced in a DVD reproducing system. Specifically, the reproduced data as decoded is provided to a demultiplexer 32, and divided into main image compressed data, sub image compressed data and audio compressed data at the demultiplexer 32. Then, the main image compressed data is provided to a video decoder 34. The sub image compressed data is provided to a sub image decoder 36. The audio compressed data is provided to an audio decoder 38.

The video decoder 34 performs a decode process on the main image compressed data to output decoded main image data. More specifically, the main image compressed data is compressed data in MPEG2 format, and the video decoder 34 performs different processes on an I picture, a P picture and a B picture to generate main image data. Then, the video decoder 34 supplies the generated main image data to the sub image decoder 36.

The sub image decoder 36 performs a decode process on the sub image compressed data, and combines the decoded sub image data with the main image data supplied from the video decoder 34. That is, the sub image decoder 36 combines a sub image such as a caption with a main image. As a result, image data including both a main image component and a sub image component is generated. It is noted in the case sub image data is absent, main image data is directly outputted as image data.

The image data outputted from the sub image decoder 36 is given to an NTSC encoder 40. The NTSC encoder 40 generates a composite image signal in NTSC standard from the image data. More specifically, the image data being a digital signal is converted into an image signal being an analog signal, and thereafter, the converted image signal is added with a synchronization signal and a color burst signal to generate the composite image signal in the NTSC standard. The composite image signal is outputted to, for example, a television set (TV) not shown. Therefore, the desired image is displayed on a CRT monitor not shown of the TV.

Meanwhile, the audio decoder 38 performs a decode process on the audio compressed data to output decoded audio data. The audio compressed data is also compressed data in MPEG format, etc. The audio decoder 38 performs a predetermined decompression process to generate audio data. The generated audio data is converted into an analog signal through a D/A converter circuit 42, and thereafter outputted to a TV or a VTR, etc. Therefore, sound to be attached to a required image is outputted from a speaker (not shown).

On the other hand, in the case the disk 12 is a CD, the decoded reproduced data is subjected to a predetermined process in a CD reproducing system to output audio data, etc. from a speaker.

In this manner, since a reproducing process is different depending on the kind of the disk 12, the disk auto-changer is made to perform a predetermined process on the reproduced data in the adequate reproducing system by identifying disks and switching between the DVD reproducing system and the CD reproducing system.

Meanwhile, the identification of the kind of the disks 12 is performed by detecting light reflecting properties attributed to the structure of the disk 12. In other words, since there is a difference in a focal distance between a DVD (one-layer or two-layered) and a CD, the kind of the disk 12 can be identified on the basis of an S waveform obtained by sampling a focus error signal. More specifically, utilizing the objective lens for a DVD, the objective lens is moved in a focusing direction (perpendicular to the disk 12 surface), thereby detecting the focus error signal thus obtained during the movement. That is, the S waveform is obtained. Where one S waveform is obtained, the disk 12 is identified as a DVD (one-layer). Where two S waveforms are obtained, the disk 12 is identified as a DVD (two-layered). Furthermore, where no S waveform is obtained, the disk 12 is identified as a CD.

Although a leaser beam outputted from the optical pickup 26 is reflected on the disk 12 in detecting the focus error signal, lower intensity of the reflected light precludes accurate identification, and therefore, this embodiment enables the identification of the reflected light in a case where the intensity of the reflected light is up to a predetermined level.

Figure 2:
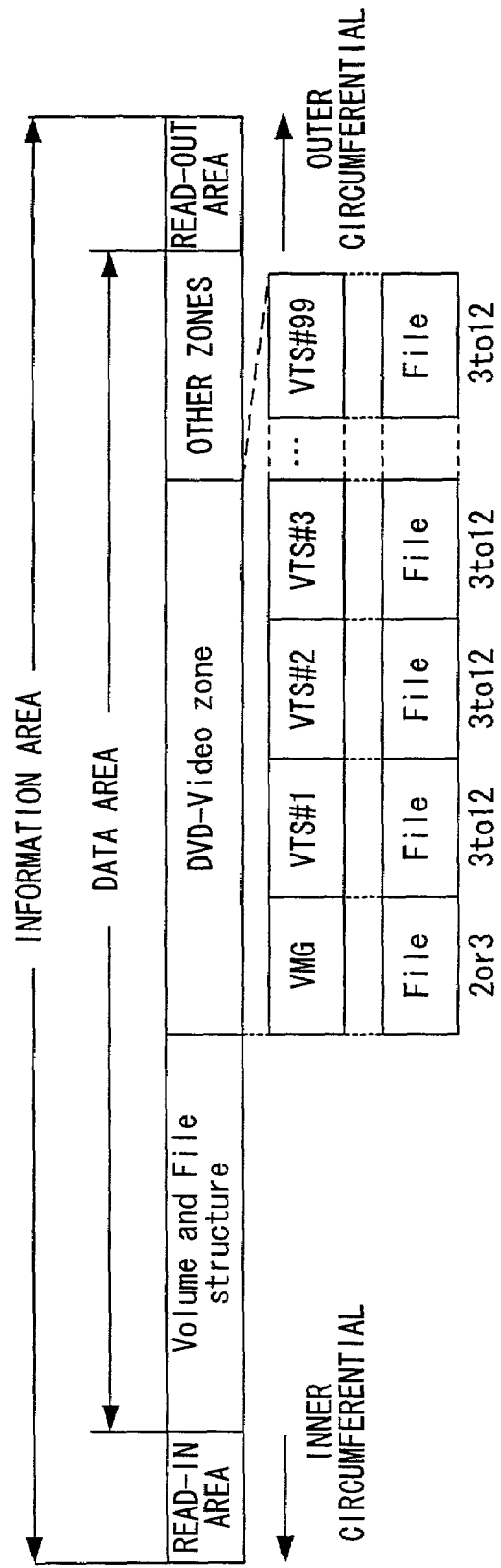
FIG. 2 is an illustrative view showing a configuration of a DVD format.

With reference to FIG. 2, the disk 12 of a DVD includes an information area. The information area is composed of a read-in area at the innermost circumferential part of the disk, a read-out area at the outermost circumferential part of the disk and a data area sandwiched between them.

The data area includes a Volume and File structure zone, a DVD-Video zone and other zones. It is noted that there is no need to provide other zones.

The Volume and File structure zone is a management information area of format, and recorded with a descriptor corresponding to a micro UDF (micro Universal Disk Format) and an ISO9660, for example.

The DVD-Video zone includes a VMG (Video Manager) and/or a plurality (9 at maximum) of VTSs (Video Title Set), which are composed of a plurality of files. The VMG is recorded with management information of a DVD such as TOC (Table of Contents) information in a CD. Each VTSs is recorded with control data needed to reproduce a title and data about the contents of the title. For example, in the case a movie is recorded on the disk 12, each of VTS is recorded with titles such as a story portion of the movie, a list of film characters, profiles of actors, or an introduction of a director.

Figure 3:
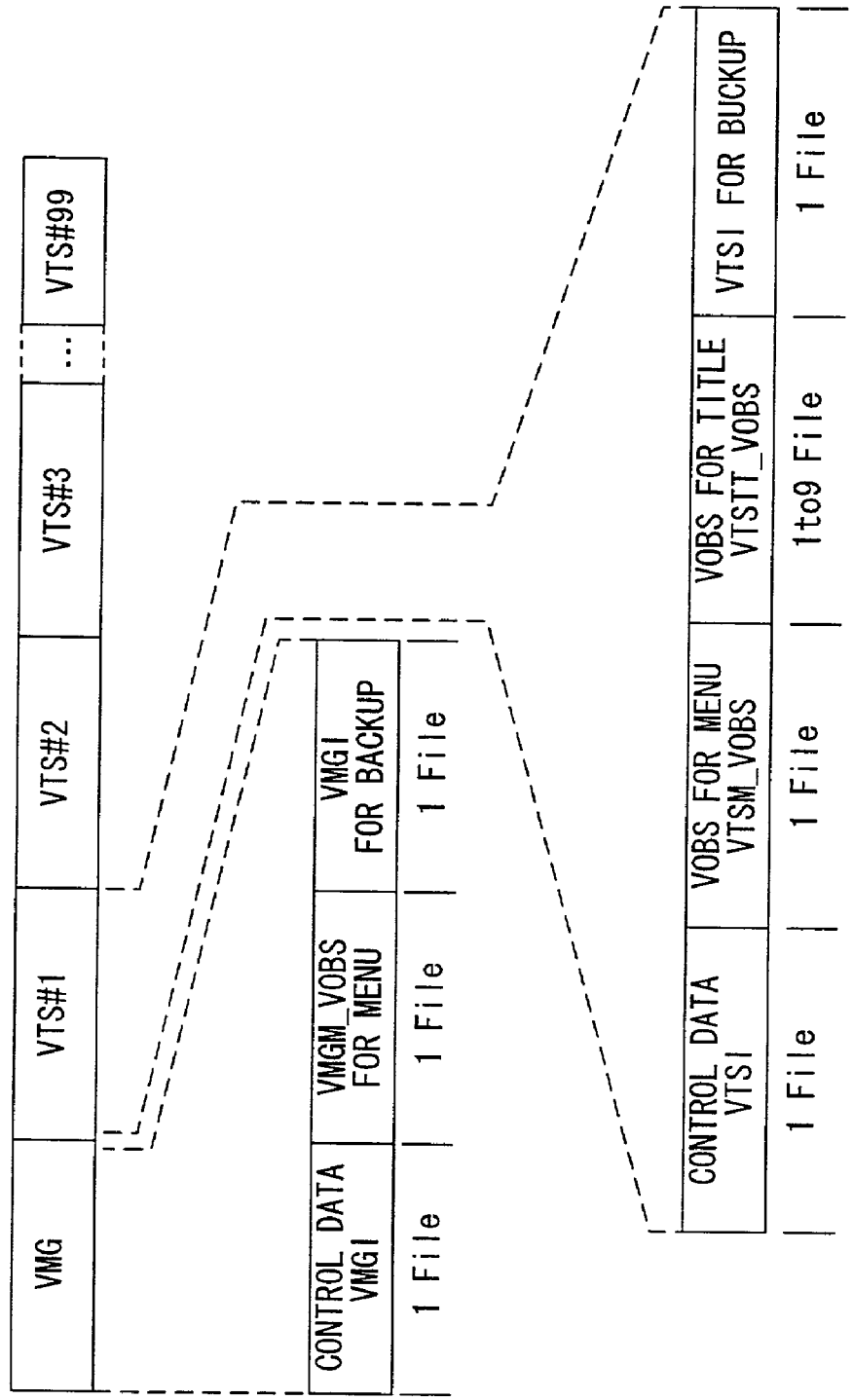
FIG. 3 is an illustrative view showing a data configuration of the DVD.

Referring to FIG. 3, the VMG is composed of VMGI (Video Manager Information) as control data, $VMGM_{13}VOBS$ for a menu and VMGI for a backup. The $VMGM_{13}VOBS$ for a menu is recorded with main image data, sub image data, audio data, and etc. of a menu screen.

The VTS is composed of VTSI (Video Title Set Information) as control data, $VTSM_{13}VOBS$ for a menu, $VTSTT_{13}VOBS$ for a title and VTSI for a backup. The $VTSM_{13}VOBS$ for a menu is recorded with main image data, sub image data, audio data, and etc. of a menu screen.

Figure 4:
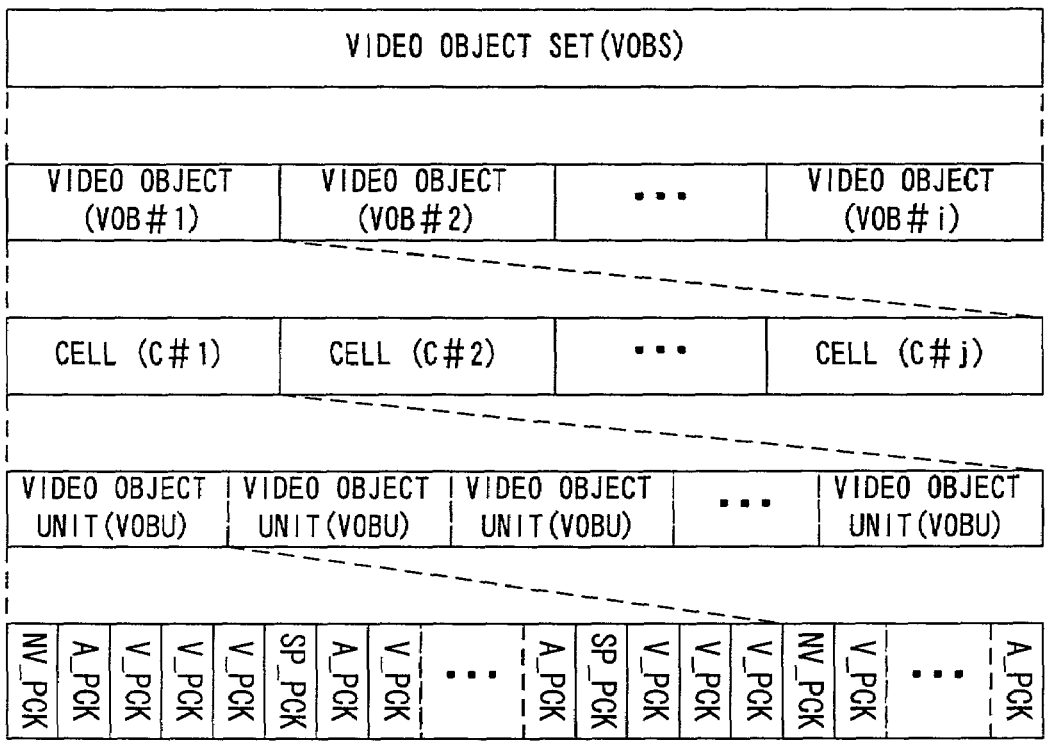
FIG. 4 is an illustrative view showing a data configuration of a VOBS.

The $VTSTT_{13}VOBS$ for a title is recorded with main image data, sub image data, audio data, and etc. corresponding to the title described above. The $VTSTT_{13}VOBS$ for a title has the structure of a conventional VOBS (Video Object Set) as shown in FIG. 4. Noted that the $VMGM_{13}VOB$ and $VTSM_{13}VOBS$ for a menu included in the VMG also have the same structure.

The VOBS is composed of one or two more chapters, i.e. VOBs (Video Object). The VOB is a unit that each data is recorded as a group on the disk 12, and composed of one or two more cells. The cell is a unit like one scene or one cut in a movie, for example, and one cell is unit of time of several minuses to 10-odd minuets. It is noted the cell is composed of one or two more VOBUs (Video Object Unit). The VOBU is a unit of time of 0.4 to 1.2 seconds in a moving picture, and includes a plurality of GOPs (Group of Pictures) in MPEG 2 format.

The VOBU is provided with one $NV_{13}PCK$, at the top of the packs, including the management information of the VOBU and is further composed of $V_{13}PCK$ being a pack having the main image data, $A_{13}PCK$ being a pack having the audio data, and $SP_{13}PCK$ being a pack having the sub image data. These $V_{13}PCK$, $A_{13}PCK$ and $SP_{13}PCK$ are decompressed in MPEG2 format, etc. to be recorded on the disk 12.

It is noted the VMGI and VTSI include a program chain (PGC) for controlling the order of reproduction. The PGC is composed of a plurality of programs (PG), each of which is set with the order of reproduction of cells. The PGC, for example, is to reproduce a story of a title, and by successively executing the PGC the overall title is reproduced. A menu screen is also reproduced by the PGC.

Referring to FIG. 5, the VMGI being the control data for the VMG is written with a video manager information management table ($VMGI_{13}MAT$), a title search pointer table ($TT_{13}SRPT$), a video title set attribute information table ($VTS_{13}ATRT$), and etc.

The $VMGI_{13}MAT$ is written with the information, the content of which is shown in FIG. 6, for example. $VMG_{13}ID$ is an identifier of the VMG information. $VMGI_{13}SZ$ is a size of the VMGI. VERN is a version number of the DVD standard. $VMG_{13}CAT$ is a video manager category and written with a flag indicating whether a copy is prohibited or not, and etc. $VLMS_{13}ID$ is an identifier for the volume set. $VTS_{13}Ns$ is the number of the VTSs. $PVR_{13}ID$ is an identifier of a data supplier. $VMGM_{13}VOBS_{13}SA$ is a start address of the $VMGM_{13}VOBS$. $VMGI_{13}MAT_{13}EA$ is an end address of the $VMGI_{13}MAT$. $TT_{13}SRPT_{13}SA$ is a start address of the $TT_{13}SRPT$. $VTS_{13}ATRT_{13}SA$ is a start address of the $VTS_{13}ATRT$. Meanwhile, $VMGM_{13}V_{13}ATR$, $VMGM_{13}AST_{13}Ns$, $VMGM_{13}AST_{13}ATR$, $VMGM_{13}SPST_{13}Ns$ and $VMGM_{13}SPST_{13}ATR$ are respectively a video attribute, the number of audio streams, an audio stream attribute, the number of sub image streams, and a sub image stream attribute of the VMGM.

Figure 7:
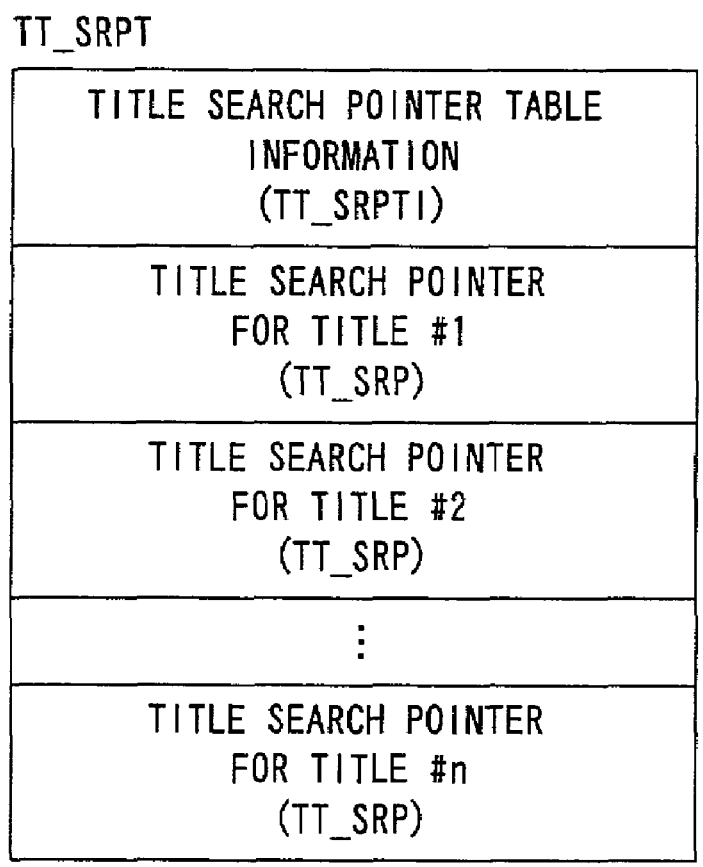
FIG. 7 is an illustrative view showing a data configuration of $TT_{13}SRPT$.

The $TT_{13}SRPT$ is written with the information of the $TT_{13}SRPT$ ($TT_{13}SRPTI$) and the $TT_{13}SRP$ for each title, for example as shown in FIG. 7. The $TT_{13}SRPTI$ is written with the number of $TT_{13}SRPT$ ($TT_{13}SRP_{13}Ns$), an end address of the $TT_{13}SRPT$ ($TT_{13}SRPT_{13}EA$), and etc as shown in FIG. 8. Meanwhile, the $TT_{13}SRP$ for each title is written with a reproducing type of a title ($TT_{13}PB_{13}TY$), the number of parts of the title ($PTT_{13}Ns$), a VTS number (VTSN), a title number of the VTS, a start address of the VTS ($VTS_{13}SA$), and etc., for example as shown in FIG. 9.

Accordingly, by reading out the $TT_{13}SRP$ for each title, the VTS to be reproduced and the start address are obtained.

Figure 10:
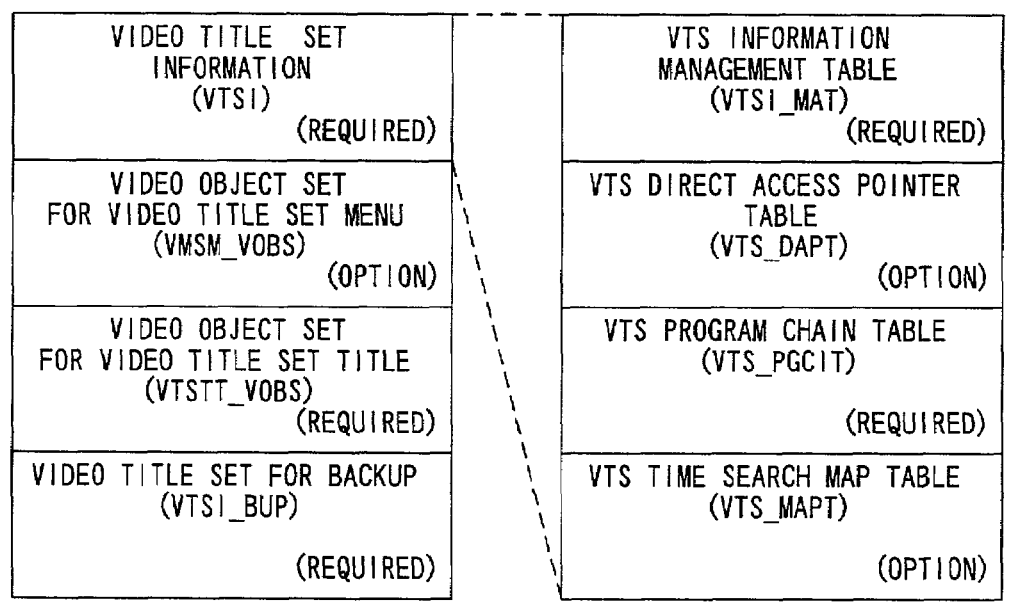
FIG. 10 is an illustrative view showing a data configuration of a VTS.

With reference to FIG. 10, the VTSI being control data of the VTS is written with a VTS information management table ($VTSI_{13}MAT$), a VTS direct access pointer table ($VTS_{13}DAPT$), a VTS program chain table ($VTS_{13}PGCIT$), a VTS time search map table ($VTS_{13}MAPT$), and etc.

The $VTSI_{13}MAT$ is written with information, the contents of which is shown in FIG. 11. $VTS_{13}ID$ is an identifier of the VTS information. $VTS_{13}SZ$ is a size of the VTS. The VERN is a version number of the DVD video standard. The $VTS_{13}CAT$ is an attribute of the VTS. $VTSM_{13}VOB_{13}SA$ is a start address of the $VTSM_{13}VOBS$ for a menu of the VTS. $VTSTT_{13}VOB_{13}SA$ is a start address of the $VTSTT_{13}VOBS$ for a title of the VTS.

$VTSI_{13}MAT_{13}EA$ is an end address of the $VTSI_{13}MAT$. $VTS_{13}DAPT_{13}SA$ is a start address of the $VTS_{13}DAPT$. $VTS_{13}PGCIT_{13}SA$ is a start address of the $VTS_{13}PGCIT$. $VTS_{13}PGCIT_{13}UT_{13}SA$ is a start address of the $VTS_{13}PGCIT_{13}UT$. $VTS_{13}MAPT_{13}SA$ is a start address of the $VTS_{13}MAPT$. $VTS_{13}V_{13}ATR$ is a video attribute of the VTS.

$VTS_{13}AST_{13}Ns$, a $VTS_{13}AST_{13}ATR$, a $VTS_{13}SPST_{13}Ns$ and a $VTS_{13}STPT_{13}ATR$ are respectively the number of audio streams, an audio stream attribute, the number of sub image streams and a sub image stream attribute of $VTS_{13}VBOS$ for a menu.

Consequently, by reading out the $VTSI_{13}MAT$, the start address of the $VTSTT_{13}VOBS$ to be reproduced, and etc. can be obtained.

For example, when the power supply of the disk auto-changer 10 is turned on, and the user operates the reproduction key of the operation panel 18, the controller 14 starts a reproducing process. Firstly, the controller 14 determines whether or not in a normal reproducing mode to reproduce the disk 12 mounted on the turntable or the disk 12 specified by the user is set.

In the normal reproducing mode, in the case the disk 12 is a DVD having data for a menu, when the disk 12 is mounted on the turntable, a menu screen is displayed on a monitor not shown. When the user performs menu selection on the menu screen and then operates the reproduction key, the reproduction starts in accordance with the operation of the menu selection. However, where the disk 12 is a CD or a DVD not having the data for a menu, the data recorded on the disk 12 is reproduced from the top.

Meanwhile, in the normal reproducing mode in the case the story portion is recorded on two or more DVDs, upon ending the reproduction of a first sheet of the disk 12, it is exchanged for a second sheet of the disk 12 by programming in advance, allowing the successive reproduction of the story portion. In this manner, until the reproduction of the story portion ends, the exchange and reproduction of the disks 12 is repeated. However, in the case the data for a menu is recorded on the second or further sheet of the disk, a menu screen is displayed upon exchanging the disk 12, thus resulting in the interruption of the reproduction.

On the other hand, when the user operates the AR key provided on the operation panel 18, the all-repeat-mode can be set. In the all-repeat-mode, when the reproduction key is operated, the disk 12 to be reproduced is mounted on the turntable by the disk auto-changer 22 in the previously programmed order.

Then, the controller 14 identifies the kind of the disk 12. Where the disk 12 is a CD, the reproducing process is executed by utilizing the objective lens for a CD in the CD reproducing system. On the other hand, where the disk 12 is a DVD, the controller 14 obtains, from the data decoder 30, the management information included in the reproduced data, and makes a jump to the start address of the story portion indicated by the management information and then continues to reproducing. In other words, in the all-repeat-mode, regardless of the presence or absence of menu data, the story portion can be reproduced from the top without displaying a menu screen.

After the reproduction of the first sheet of the disk 12 is completed, the disk 12 is exchanged, for example, in the programmed order. More specifically, the disk changer 22 removes the completed disk 12 from the turntable to the original housing portion, and mounts the disk 12 to be reproduced next on the turntable from the housing portion under the control of the servo circuit 20 receiving the control signals from the controller 14.

Then, the kind of the disk 12 is identified in a manner similar to that of the first sheet of the disk 12. Where the disk 12 is a DVD, the controller 14 controls so as to reproduce the story portion from the top. Thus, until the reproduction of all the disks is completed or the all-repeat-mode is canceled by the manipulation of the AR key, the plurality of disks 12 are reproduced successively.

For example, in the DVD format described above, the story portion is recorded in the VBOS ($VTSTT_{13}VOBS$) for a title, and generally recorded in the first title (VTS#1). Accordingly, it would be appropriate that the reproduction is started from the $VTSTT_{13}VBOS$ of the VTS#1 in order to reproduce the story portion.

More specifically, when obtaining the start address of the VTS#1 ($VTS_{13}$ SA) from the VMG and then reading the $VTSI_{13}MAT$ from the VTSI included in the VTS#1, the $VTSTT_{13}VOBS$ is obtained. As can be understood from the structure of the VBOS shown in FIG. 4, starting the reproduction from the address represented by the $VTSTT_{13}VOBS_{13}SA$ thus obtained means the reproduction starts from the first chapter (VOB#1) included in the first title ($VTSTT_{13}VOBS$ included in VOB#1). Consequently, it is possible to reproduce the story portion from the top.

Figure 12:
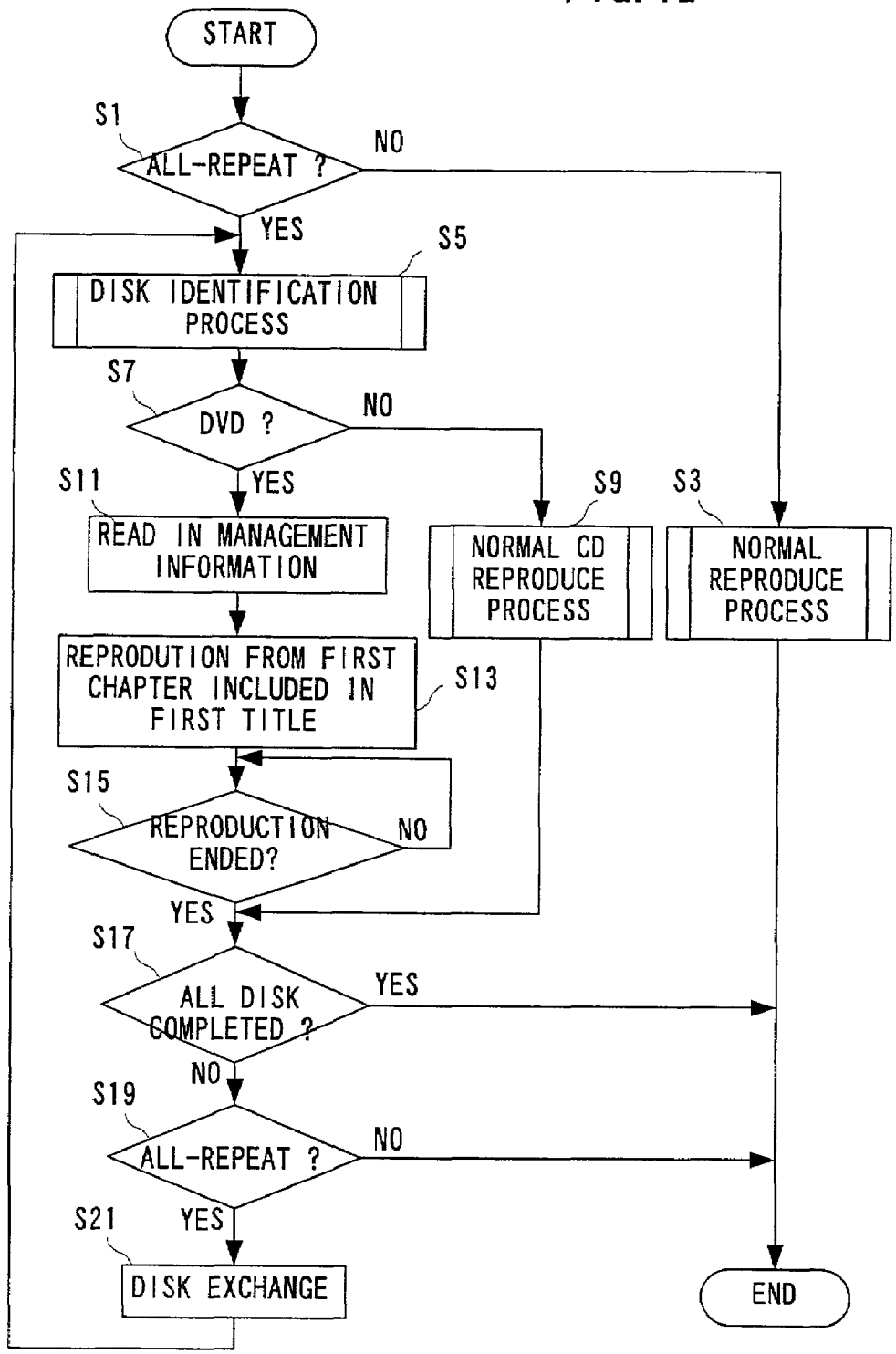
FIG. 12 is a flowchart showing a part of processing of a controller.

Specifically, the controller 14 performs processings according to the flowchart shown in FIG. 12. More specifically, when the reproduction key is manipulated, the controller 14 starts to process and determines whether the all-repeat-mode is set or not in step S1. If "NO" is determined in the step S1, i.e. the all-repeat-mode is not set, the normal reproducing mode is determined. The normal reproducing process is executed in step S3. That is, the disk 12 being mounted on the turntable at present is reproduced. Alternatively, the disk 12 specified by the user is mounted on the turntable and reproduced.

Meanwhile, if the disk 12 is a DVD having menu data, a menu image is displayed before reproducing, and the reproducing process is continued in accordance with menu selection by the user.

On the other hand, if "YES" is determined in the step S 1, i.e. the all-repeat-mode is determined, the identification process for the disk is performed in step S5. Through this process, whether the disk 12 is a DVD (one-layer or two-layered) or a CD is determined. It is noted an explanation will be made as to the disk identification process in detail.

In the following step S 7, whether the disk 12 is a DVD (one-layer or two-layered) or not is determined. If "NO" is determined in the step S7, i.e. the disk 12 is a CD, the normal CD reproducing process is executed in step S9. After completion of the reproduction, the process proceeds to step S 17. In other words, switched to the objective lens for a CD and the CD reproducing system according to the instruction of the controller 14, the reproducing process is executed.

On the other hand, if "YES" is determined in the step S 7, i.e. a DVD, in step S 11 the management information of the disk 12 is read in.

More specifically, the controller 14 starts read-out from the read-in area of the disk 12, and then reads data out of the volume-and-file-structure-zone, storing it to a predetermined area of the RAM 16. Then, the management information such as a recording location and size of each file is obtained from the stored data.

It is noted, in the case the disk 12 is a DVD (one-layer), the management information is read in the DVD (one-layer) reproducing mode while in the case of a DVD (two-layer), the management information is read in the DVD (two-layered) reproducing mode.

The management information includes a recording location and size of the file composing the VMG, and on the basis of them, the controller 14 reads the VMG from the video zone, and then storing it to a predetermined area of the RAM 16.

Then, searching for the $VMGI_{13}MAT$ of the management table of the VMGI, a start address of the $TT_{13}SRPT$ is obtained. On the basis of this, searching for the $TT_{13}SRPTI$, the number of $TT_{13}SRPs$ for a title is obtained. In other words, how many titles are included is apparent. Then, searching for the $TT_{13}SRP$ for each title, a start address of each VTS is obtained. That is, a start address of the VTS# 1 (the first title) including the data corresponding to the story portion can be obtained.

Next, the controller 14 reads the data from the start address of the first title, and then stores it to the RAM 16. Searching for the VTSI$_{13}$MAT of the management table of the VTSI from the stored data, a start address, and etc. of the VTSTT$_{13}$VOBS are obtained.

In the following step S 13, the reproduction starts from the first chapter included in the first title. That is, reading into the data from a start address of the VTSTT$_{13}$VOBS for a title obtained from the process in the step S 11, the reproduction is started. In the following step S15, it is determined whether the reproduction is ended or not. In the step S 15, if "NO" is determined, i.e. the reproduction of the first title is not ended, the process returns to the same step S 15 to continue the reproducing process.

On the other hand, if "YES" is determined in the step S 15, i.e. the reproduction of the disk 12 is ended, whether the reproduction of all of the disks is ended or not is determined in step S 17. More specifically, if "YES" is determined in the step S 17, i.e. the reproduction of all of the disks has been ended, the process is ended. If "NO" is determined in the step S 17, i.e. the reproduction of all of the disks has not ended, whether the all-repeat-mode is set or not is determined in step S 19. That is, it is determined whether the all-repeat-mode is not canceled. If "YES" is determined in the step 19, i.e. the all-repeat-mode is not canceled, the disk 12 is exchanged, by outputting the control signal from the servo circuit 20 in step S 21. Then the process returns to the step S 5. On the other hand, if "NO" is determined in the step S 19, i.e. the all-repeat-mode is canceled, the process ends.

Figure 13:
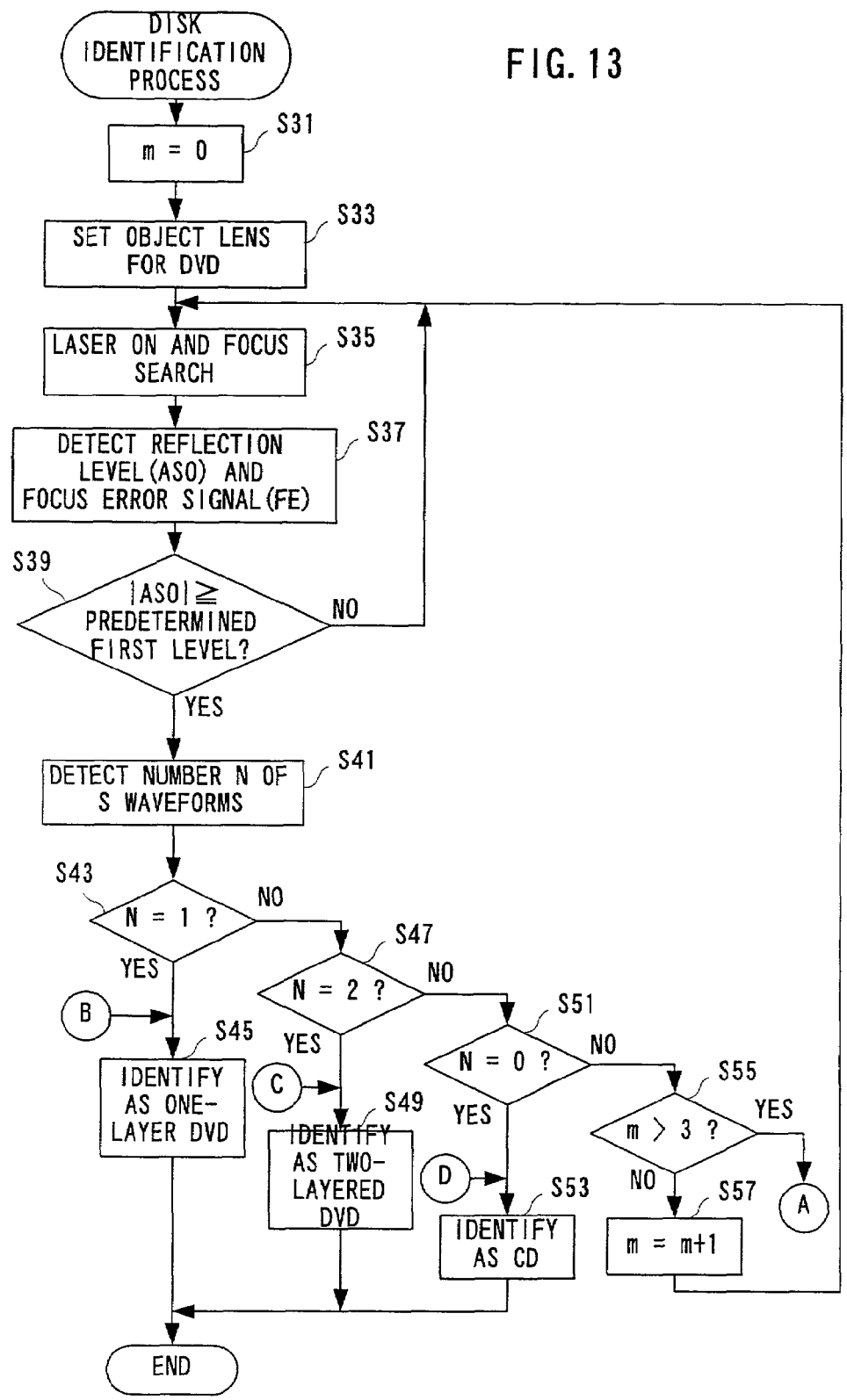
FIG. 13 is a flowchart showing a part of a disk identification process of the controller.

As shown in FIG. 13, when the disk identification process starts in the step S 5 shown in FIG. 12, the controller 14 initializes a count value in step S31. The objective lens of the optical pickup 26 is set for a DVD in step S 33. Upon turning the laser on, the focus is searched in step S 35. That is, the objective lens is moved within the movable range of the lens from the lowermost position to the uppermost position. Then, a reflection level (ASO) from the disk 12 and a focus error signal (FE) are detected in step S 37.

In the following step S 39, it is determined whether an absolute value of the reflection level is up to the first predetermined level or not. If "NO" is determined in the step S 39, i.e. the absolute value of the reflection level is under the first predetermined level, the process returns to the step S 35 to measure again. It is noted the first predetermined level is beforehand obtained through experiment, etc.

On the other hand, if "YES" is determined in the step S 39, i.e. the absolute value of the reflection value is up to the first predetermined level, the number N of S waveforms is detected in step S 41. More specifically, as can be understood from the detected results (samples) of focus error signals of a DVD (one-layer) and DVD (two-layered) shown in FIG. 15 and FIG. 16, after detecting a focus error signal having lower level than the second predetermined level, if the focus error signal exceeding the third predetermined level is detected, it is determined the number of the S waveforms is one. Namely, in the case of a DVD (one-layer), the number N is 1 while in the case of a DVD (two-layered), the number N is 2.

Figure 17:
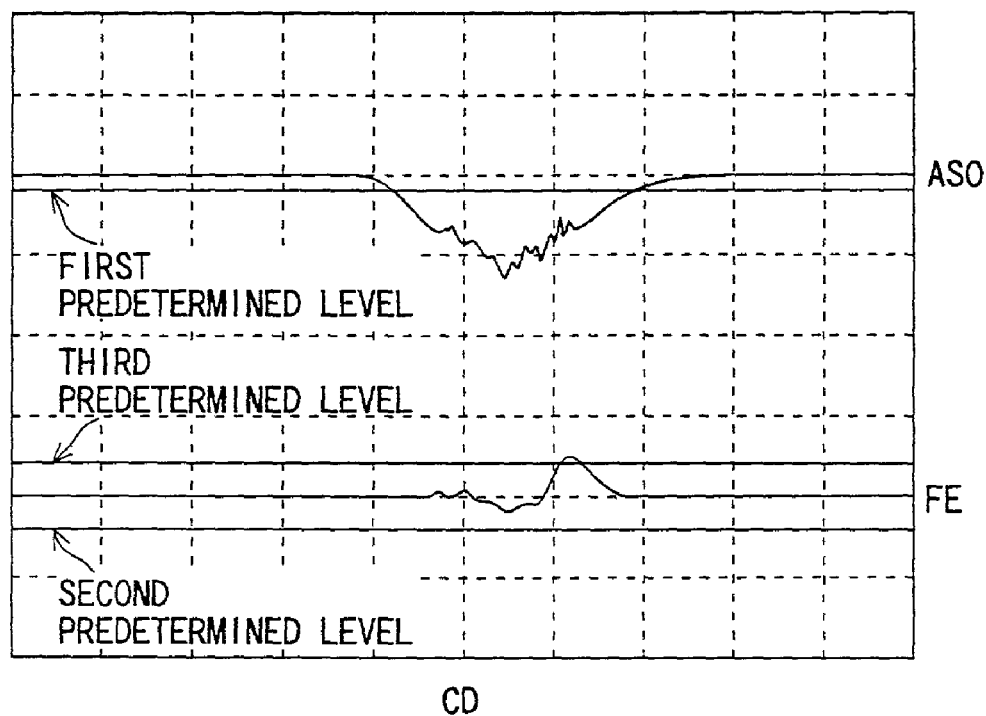
FIG. 17 is a graph showing a focus error signal characteristic of a CD.

It is noted, in the case the disk 12 is a CD, since a focus error signal shown in FIG. 17 is detected, i.e. an S waveform is not detected unlike a DVD (one-layer) or a DVD (two-layered), the number N is 0.

Figure 15:
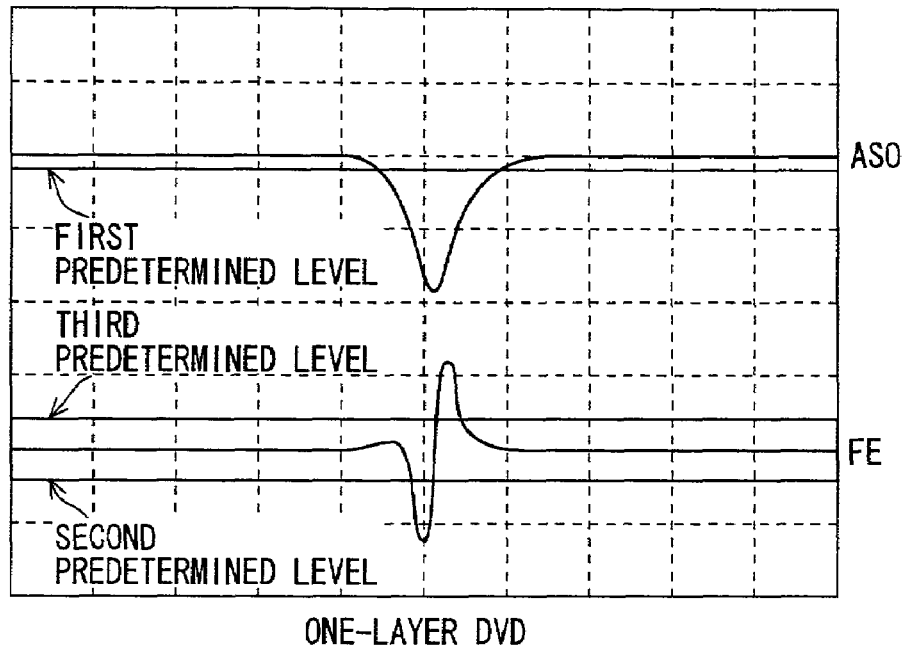
FIG. 15 is a graph showing a focus error signal characteristic of a one-layer DVD.
Figure 16:
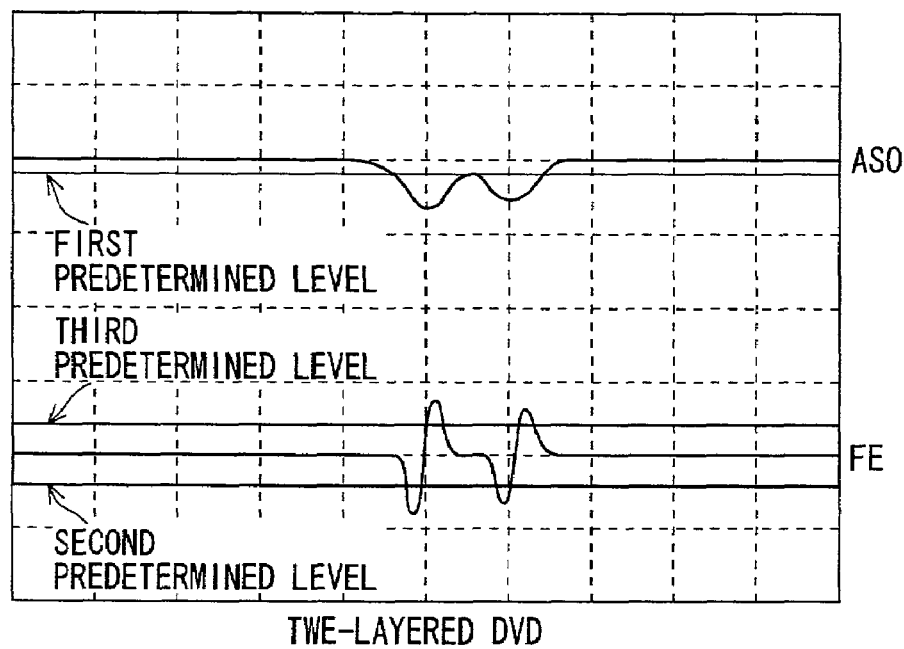
FIG. 16 is a graph showing a focus error signal characteristic of a two-layered DVD.

Meanwhile, the level of the reflected light (ASO) reflected on the disk 12 surface is shown in the FIG. 15 to the FIG. 17. It is apparent that in the case the absolute value of the reflection level is larger than that of the first level, the S waveform or the like can be accurately detected.

Accordingly, firstly, whether the number N is 1 or not is determined in step S 43. If "YES" is determined in the step S 43, i.e. the number N is 1, it is determined the disk 12 is a DVD (one-layer), and the process ends. On the other hand, if "NO" is determined in the step S 43, i.e. the number N is not 1, whether the number N is 2 or not is determined in step S 47.

If "YES" is determined in the step S 47, i.e. the number N is 2, it is determined the disk 12 is a DVD (two-layered), and the process ends. On the other hand, if "NO" is determined in the step 47, i.e. the number N is not 2, whether the number N is 0 or not is determined in step S51. If "YES" is determined in the step S 51, i.e. the number N is 0, it is determined that the disk 12 is a CD in step S 53, and the process ends. On the other hand, if "NO" is determined in the step S 51, i.e. the number N does not correspond to any value, the failure of the detection of the focus error signal is determined. In step S 55, whether the count value m is more than 3 or not is determined.

Figure 14:
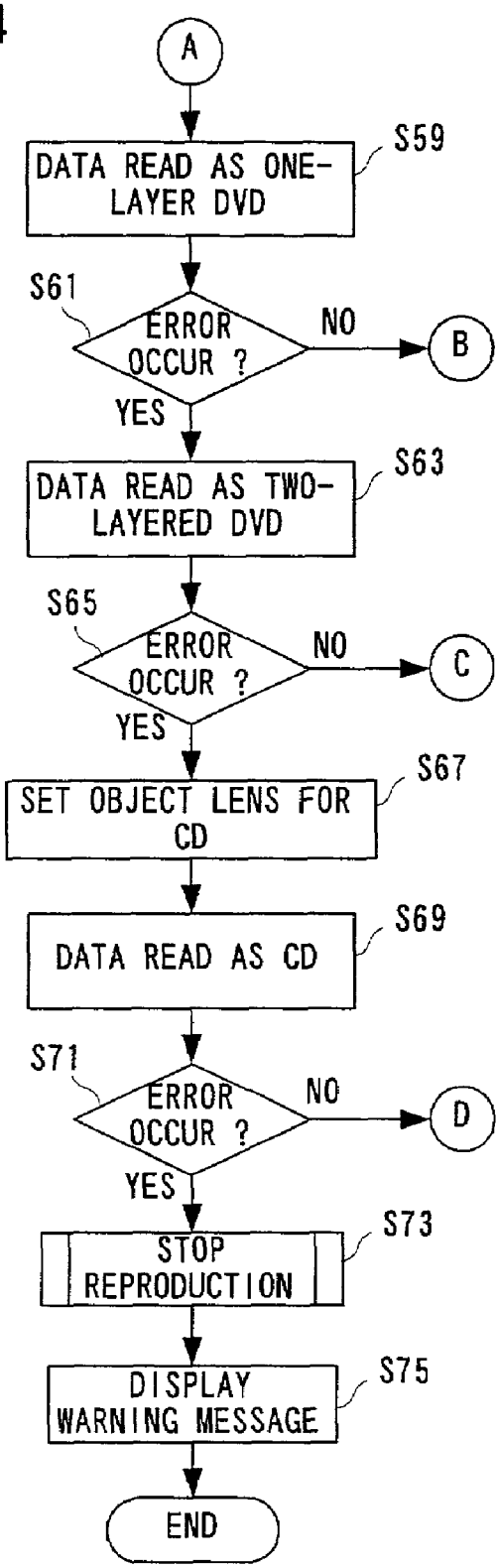
FIG. 14 is a flowchart showing another part of the disk identification process of the controller.

If "NO" is determined in the step S 55, i.e. the detection of the focus error signal (identification process) is less than 3, 1 is added to the count value m in step S 57, and the process returns to the step S 35 to repeat the process. On the other hand, if "YES" is determined in the step 55, i.e. the count value m is more than 4, it is determined the detection of 3 focus signals results in the failure of the identification of the kind of the disk 12. The process proceeds to step S 59 shown in FIG. 14.

In the step S 59, the disk 12 is regarded as a DVD (one-layer), attempting to read out data. In the following step S 61, whether an error occurs or not is determined. In other words, it is determined whether data could not be read out or not. If "NO" is determined in the step S 61, i.e. the data can be read out, the process returns to the step S 45 in FIG. 13, identifying the disk as a DVD (one-layer). On the other hand, if "YES" is determined in the step 61, i.e. the data cannot be read out, the disk 12 is regarded as a DVD (two-layered) in step S63, attempting to read out data. In the following step S 65, whether an error occurs or not is determined. If "NO" is determined in the step S 65, i.e. the data can be read out, the process returns to the step S 49 in FIG. 13, identifying the disk as a DVD (two-layered).

On the other hand, if "YES" is determined in the step S 65, i.e. the data cannot be read out, the objective lens is set for a CD in step S 67. In step S 69, the disk 12 is regarded as a CD, attempting to perform data read. In the following step S 71, whether an error occurs or not is determined. If "NO" is determined in the step S 71, i.e. the data can be read out, the process returns to the step S 53, identifying the disk as a CD. On the other hand, if "YES" is determined in the step S 71, it is determined that it is unable to read the data from the disk 12, stopping the reproduction in step S 73. In step S 75, a warning message such as "UNABLE TO READ OUT THE DISK" and "DISK ERROR" is displayed on the monitor, and ends the process. It is noted that warning sound may be generated.

It is noted, after identifying the kind of the disk 12, the data is read out by performing a focus servo circuit in each reproducing mode, and the reproduction is executed. However, in case the identification of the disk 12 is in error, it is unable to read out the data. Consequently, in this case, reading out of the data is attempted three times. When it is unable to further read out the data, the disk 12 is regarded as a DVD (one-layer), a DVD (two-layered) and a CD in this order, attempting to read data out. Furthermore, when it is unable to read out data, the reproduction is stopped (error) and a warning message or warning sound may be generated.

According to this invention, when the all-repeat-mode is set, since the story portion is unconditionally reproduced regardless of the presence or absence of the data for a menu, a menu screen cannot be displayed upon exchanging a disk. Accordingly, a user can successively view the story portion without manipulating menu selection along the way. Thus, the characteristic of the all-repeat-mode is fully attained, improving in ease of operation and viewing.

It is noted in the above-described embodiment, the identification of the disk 12, read-in of the management information, and etc. are performed immediately before reproducing. However, these processes may be performed prior to the reproducing. In other words, upon stocking a plurality of disks 12, the identification of the disk and read-in of the management information may be performed on all of the disks 12, storing it as disk information to a memory (not shown) in advance. In this case, since the kind of the disk 12 is not identified upon exchanging the disks, a waiting time in exchanging the disks can be shortened. That is, ease of viewing can be further improved.

Meanwhile, in the above-described embodiment, the reproduction is started from the first chapter included in the first title in order to reproduce from the story portion. It is because the start of the recording position of the story portion generally corresponds to the first chapter included in the first title at the present. In other words, the story portion need not be so recorded as to start from the first chapter included in the first title, and will be able to be so recorded as to start from the specified chapter included in the specified title in the future. Accordingly, in such case, it is needless to say that the reproduction starts from the specified chapter included in the specified title.

Meanwhile, in the above-described embodiment, the start address of the first chapter included in the first title (VTSTT$_{13}$VOB$_{13}$SA) is detected in order to start reproduction from the story portion in accordance with the above-described DVD format. However, a format of a DVD is not limited to the above described one, and a method of detecting a story portion, a start address, and etc is not limited to the above described embodiment and can be changed properly.

For example, if the title chapter table written with the title including the number of chapters and a start address of each chapter is written into the VTSI, the start address of the first chapter can be detected from this table.

Meanwhile, in a DVD, data corresponding to the story portion has the longest data length (volume, size, the number of files or chapters, etc.) among other data such as control data and data for a menu. Accordingly, a data group having the longest data length may be detected from the management information of the disk 12, and this is determined to be the story portion, making it possible to reproduce the story portion from the start address of the data group. If do this, the disk 12 which is not recorded with the story portion in the first title can be reproduced from the story portion.

Figure 18:
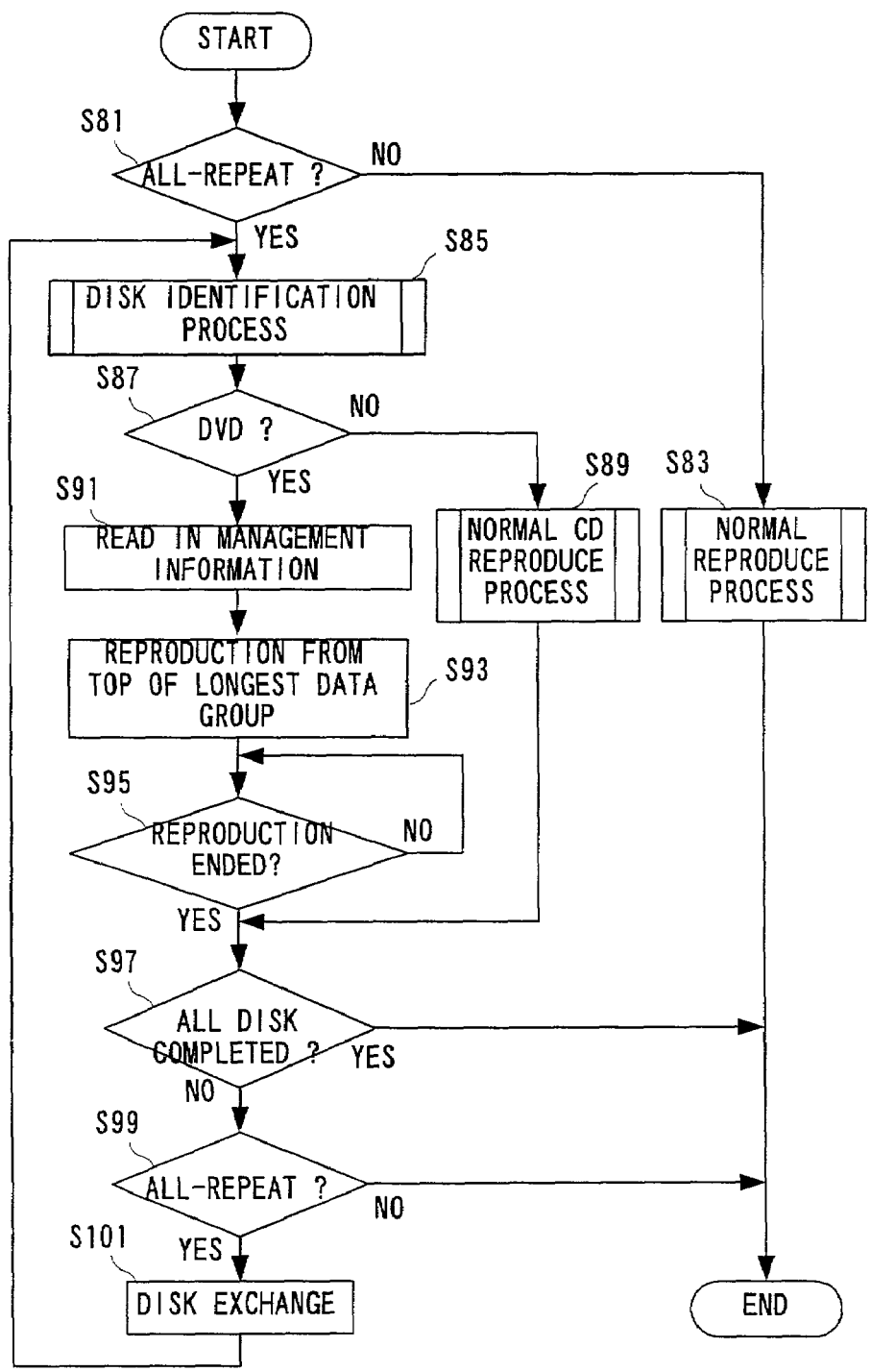
FIG. 18 is a flowchart showing a part of other processing of the controller.

Specifically, the controller 14 executes processes according to the flowchart shown in FIG. 18. Incidentally, since the process of steps S 81 to S 89 is the same process as steps S 1 to S 9 shown in FIG. 12, a duplicate explanation is omitted. In step S 91, the controller 14 reads in the management information from the disk 12 and searches (detects) for the data group having the longest data length, obtaining the start address of the detected data group. For example, detecting the title having the most numbers of files, it is determined the title is recorded with the story portion. It is noted, in the case of the above-described disk 12 of the DVD format, the number of chapters (VOB) included in the VOBS (title) is detected, and it is determined the title having the most chapters is recorded with the story portion. Then, the start address of the title which is determined to be recorded with the story portion is obtained. In the following step S 93, jumping to the obtained start address, reproduction starts. In other words, it is possible to reproduce the story portion from the top.

Since the following steps S 95 to S 101 is also the same processes as the step S 15 to S 21, a duplicate explanation is omitted.

In such case, since it is possible to start the story portion from the top, the menu screen need not be displayed upon exchanging the disk.

It is noted an explanation is made as to the case that one story portion is recorded in a DVD, whereas in the case more than two story portion is recorded, the story portion recorded in the first title is reproduced in the process shown in FIG. 12, and the story portion recorded in the title having the longest data length is reproduced in the process shown in FIG. 18.

Meanwhile, an explanation is made as to the disk auto-changer capable of reproducing a DVD and a CD. It is needless to say that it is applicable to a DVD auto-changer capable of reproducing a DVD only. In such case, in the identification process of the disk, if a CD is determined, it would be appropriate that an alarm of DISK ERROR is informed. Alternatively, on the assumption that no other disk than a DVD is mounted on, determination may be made on only a DVD (one-layer) or a DVD (two-layered).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A DVD auto-changer exchanging and successively reproducing a plurality of disks stocked, the DVD auto-changer comprising;
   a setter which sets an all-repeat mode;
   an exchanger which exchanges said disks;
   a story portion reproducer which forcedly reproduces a story portion upon exchanging said disks by said exchanger without displaying a menu when said all-repeat-mode is set; and
   a normal reproducer which executes a normal reproducing process of a DVD including a menu display based on menu data on the DVD when said all-repeat-mode is not set.

2. A DVD auto-changer according to claim 1, wherein said story portion reproducing means includes an obtaining means for obtaining a start address of said story portion, and a reproduction executing means for reproducing from said start address.

3. A DVD auto-changer according to claim 2, wherein said start address of said story portion is a start address of a specified chapter included in a specified title.

4. A DVD auto-changer according to claim 3, wherein said specified chapter of said specified title is a first chapter included in a first title.

5. A DVD auto-changer according to claim 2, wherein said story portion reproducing means further includes a detecting means for detecting a data group having a longest data length, and said obtaining means obtains a start address of said data group having the longest data length.

6. A DVD auto-changer for exchanging and successively reproducing a plurality of disks stocked, said DVD auto-changer is provided with a controller, wherein said controller executes the following steps
 (a) determining whether an all-repeat-mode is set or not;
 (b) reproducing a story portion upon exchanging said disks without displaying a menu when said all-repeat-mode is set; and
 (c) executing a normal reproducing process of a DVD including a menu display based on menu data on the DVD when said all-repeat-mode is not set.

7. A DVD auto-changer according to claim 6, wherein said step (b) includes the following steps:
 (b1) obtaining a start address of said story portion; and
 (b2) reproducing from said start address.

8. A DVD auto-changer according to claim 7, wherein a start address of a specified chapter included in a specified title of a DVD format is obtained in said step (b1).

9. A DVD auto-changer according to claim 8, wherein said specified chapter included in said specified title is a first chapter included in a first title.

10. A DVD auto-changer according to claim 7, wherein said step (b1) includes the following steps:
 (b3) detecting a data group having a longest data length; and
 (b4) obtaining a start address of said data group having the longest data length.

* * * * *